Nov. 8, 1960 G. B. HALLAHAN 2,959,074
INDEXING TABLE AND CONTROL THEREFOR
Filed June 25, 1958 10 Sheets-Sheet 1
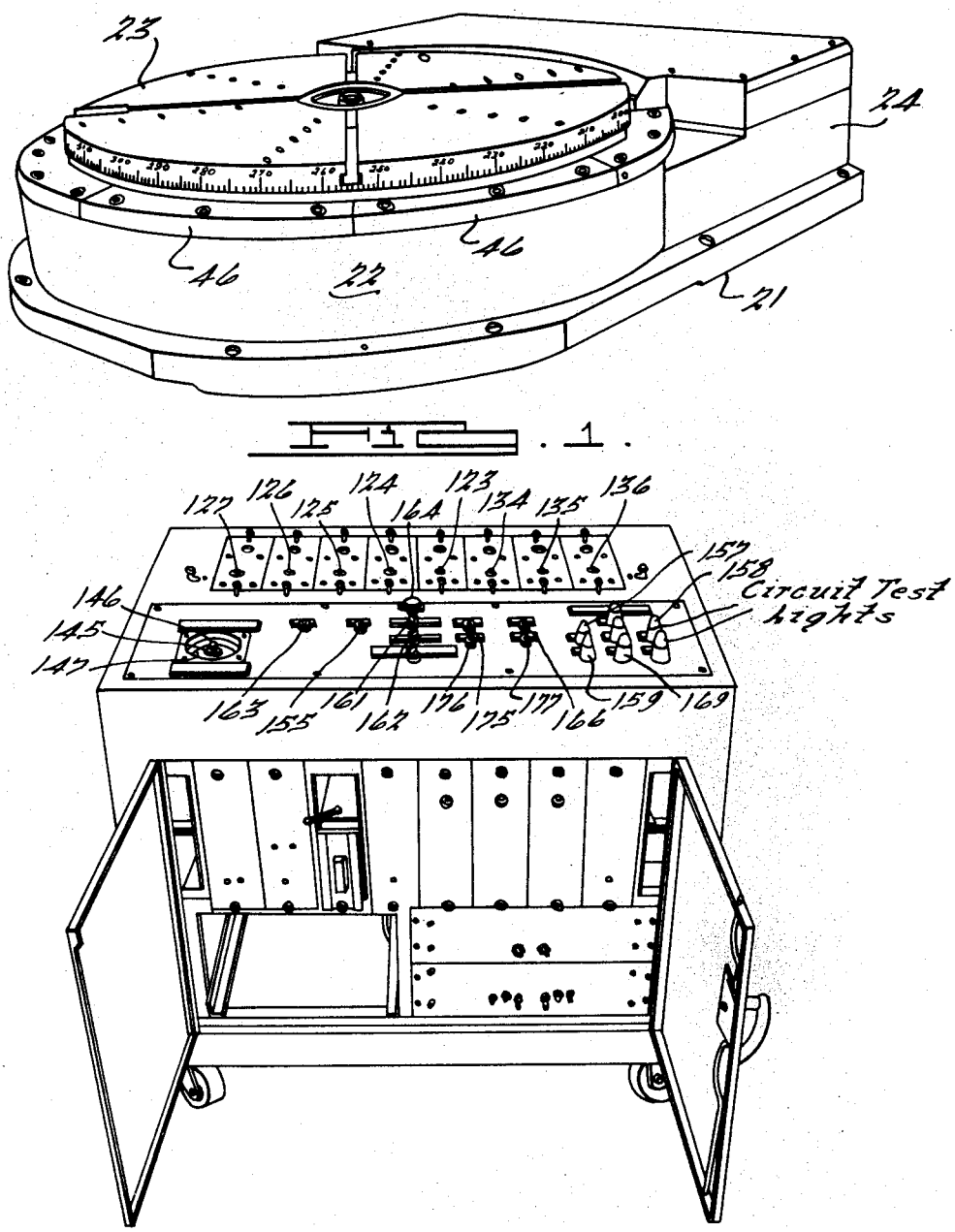
INVENTOR.
Gerald B. Hallahan
BY John Joseph Roethel
ATTORNEY.

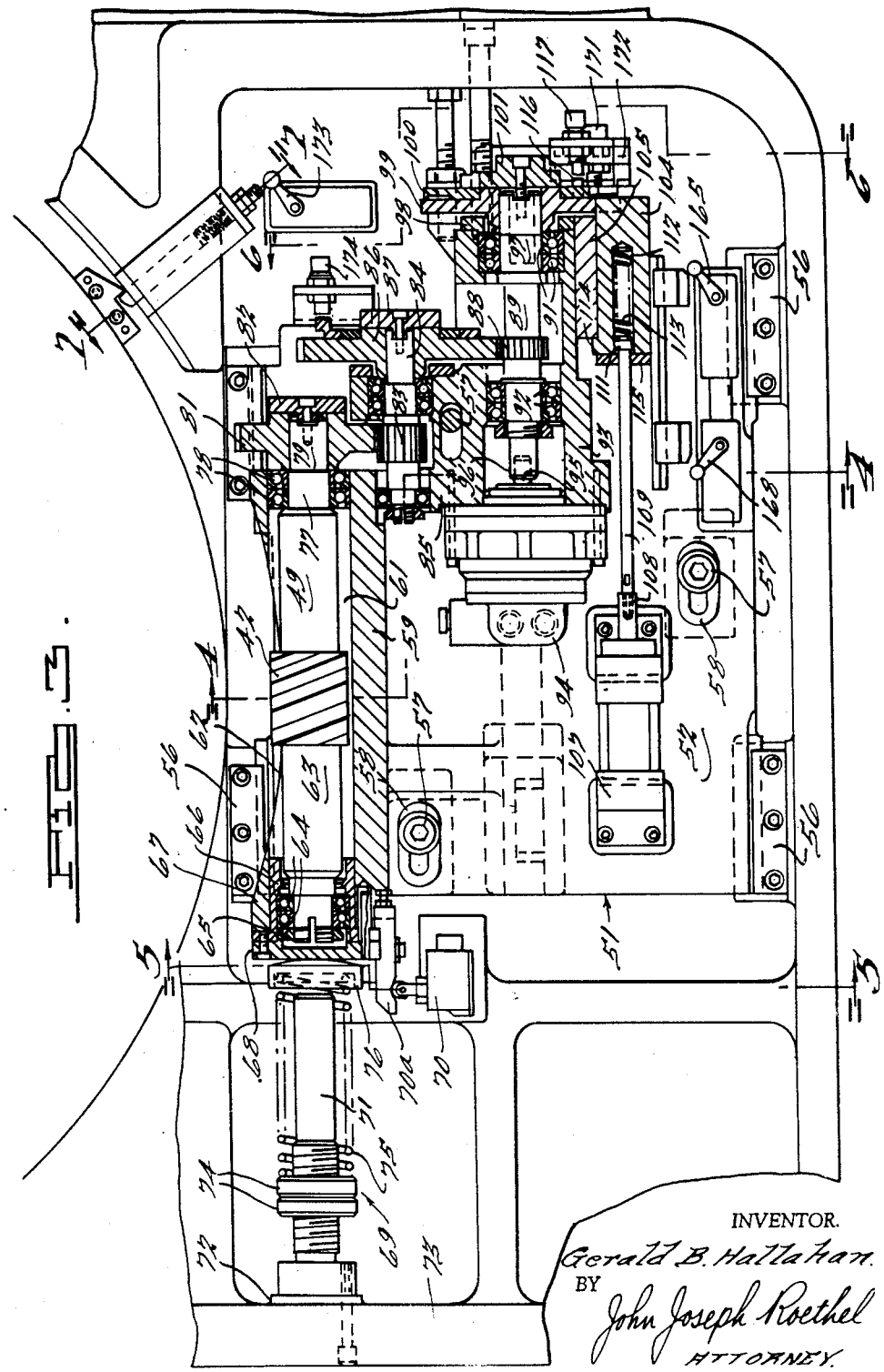

Nov. 8, 1960                G. B. HALLAHAN                2,959,074
                    INDEXING TABLE AND CONTROL THEREFOR
Filed June 25, 1958                                    10 Sheets-Sheet 3
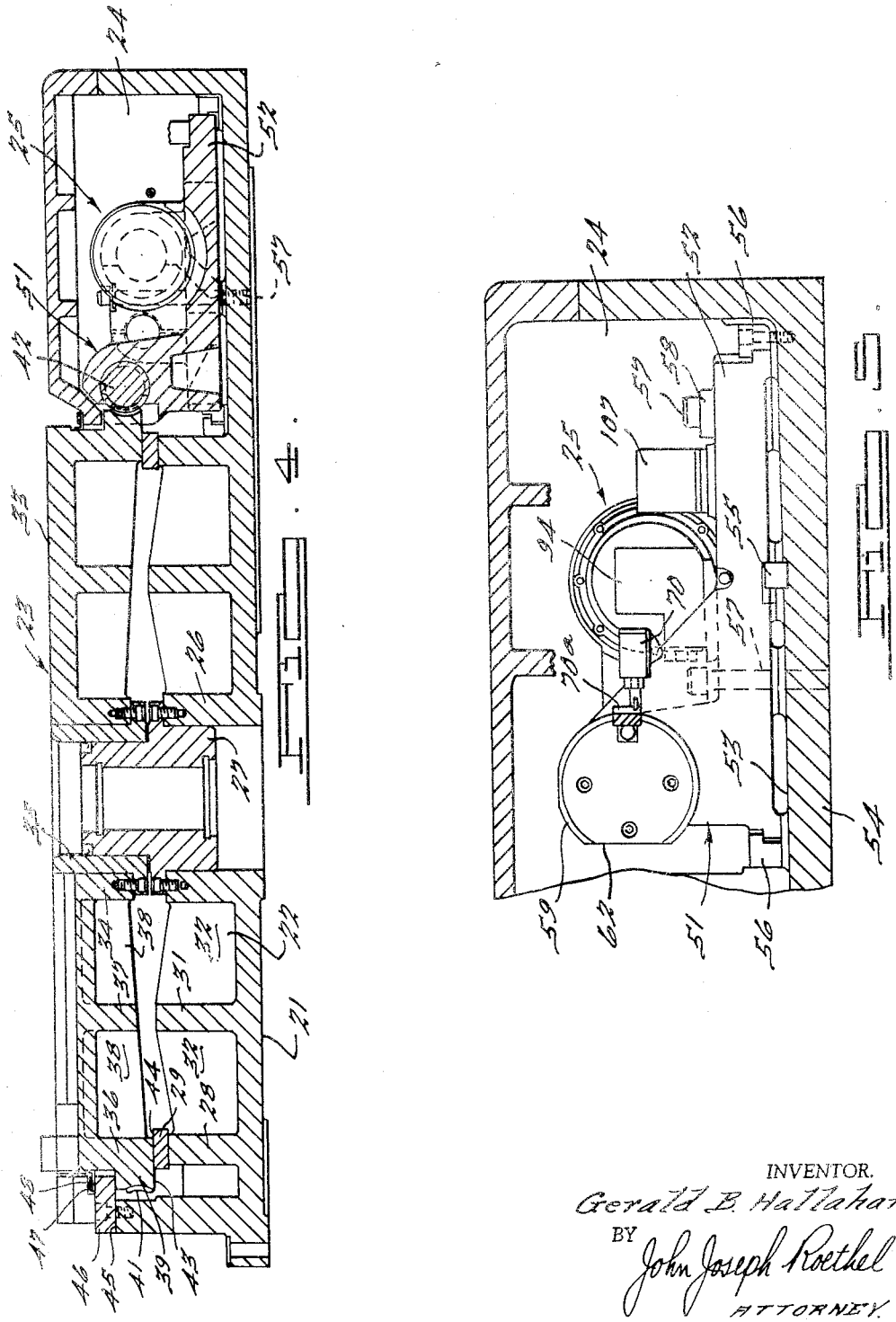
INVENTOR.
Gerald B. Hallahan
BY John Joseph Roethel
ATTORNEY.

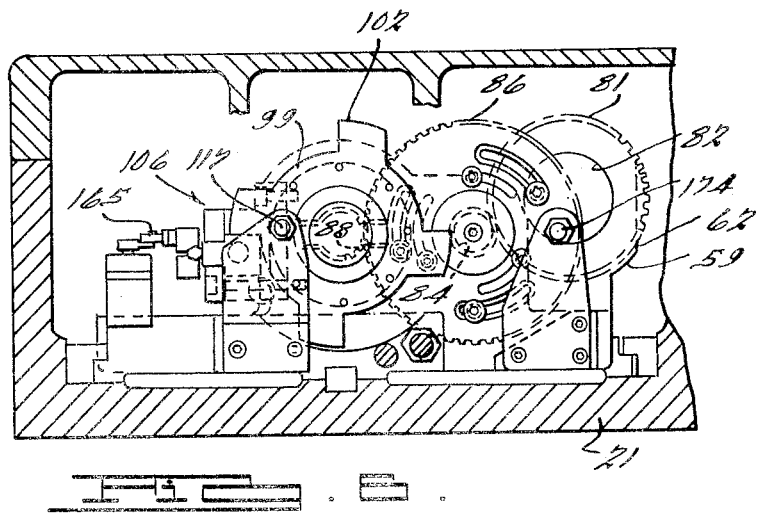
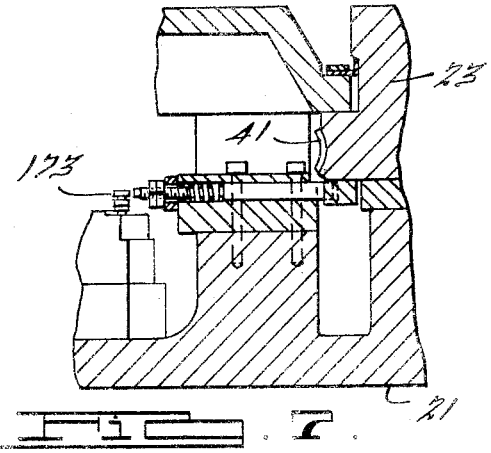

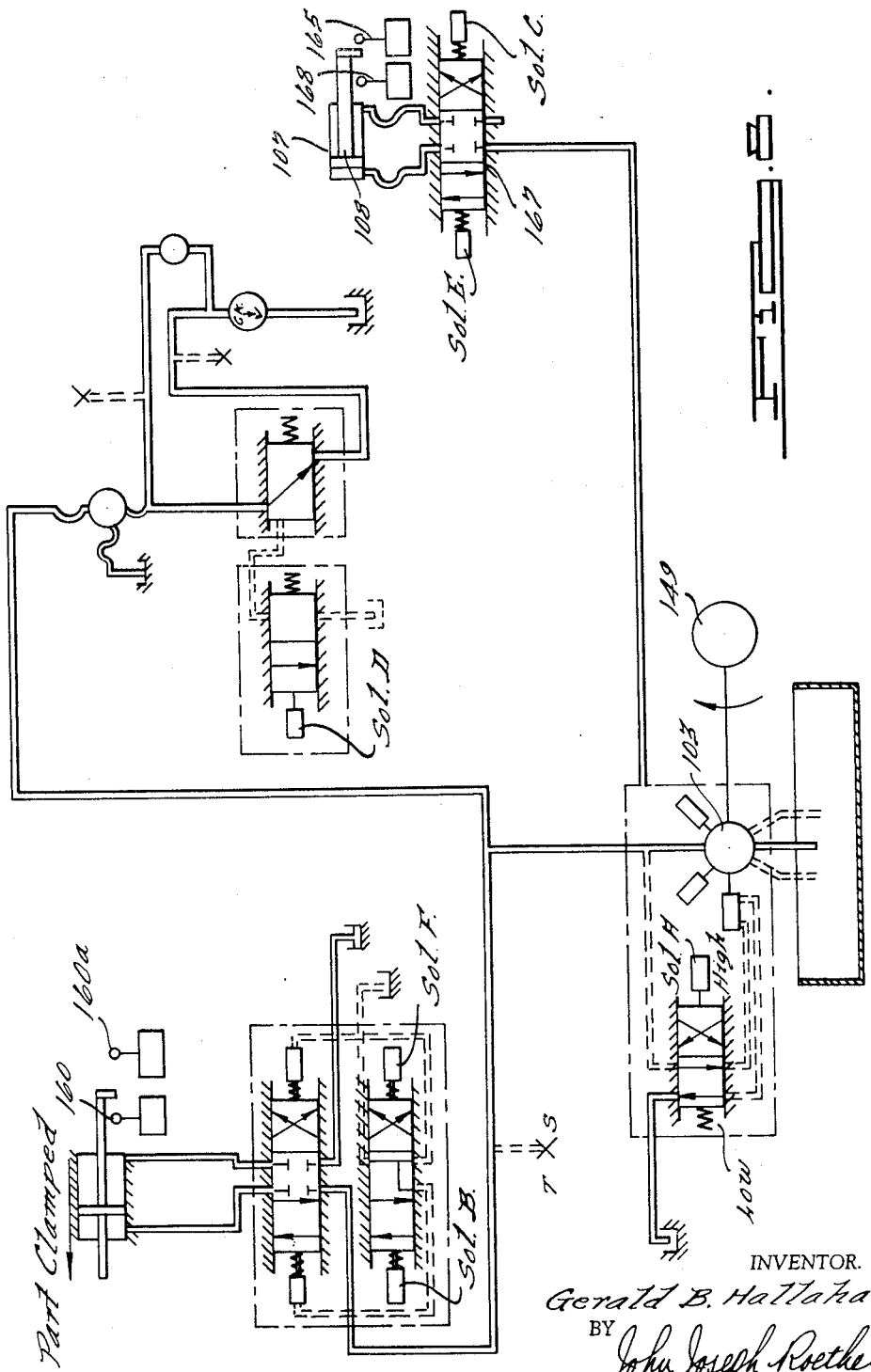

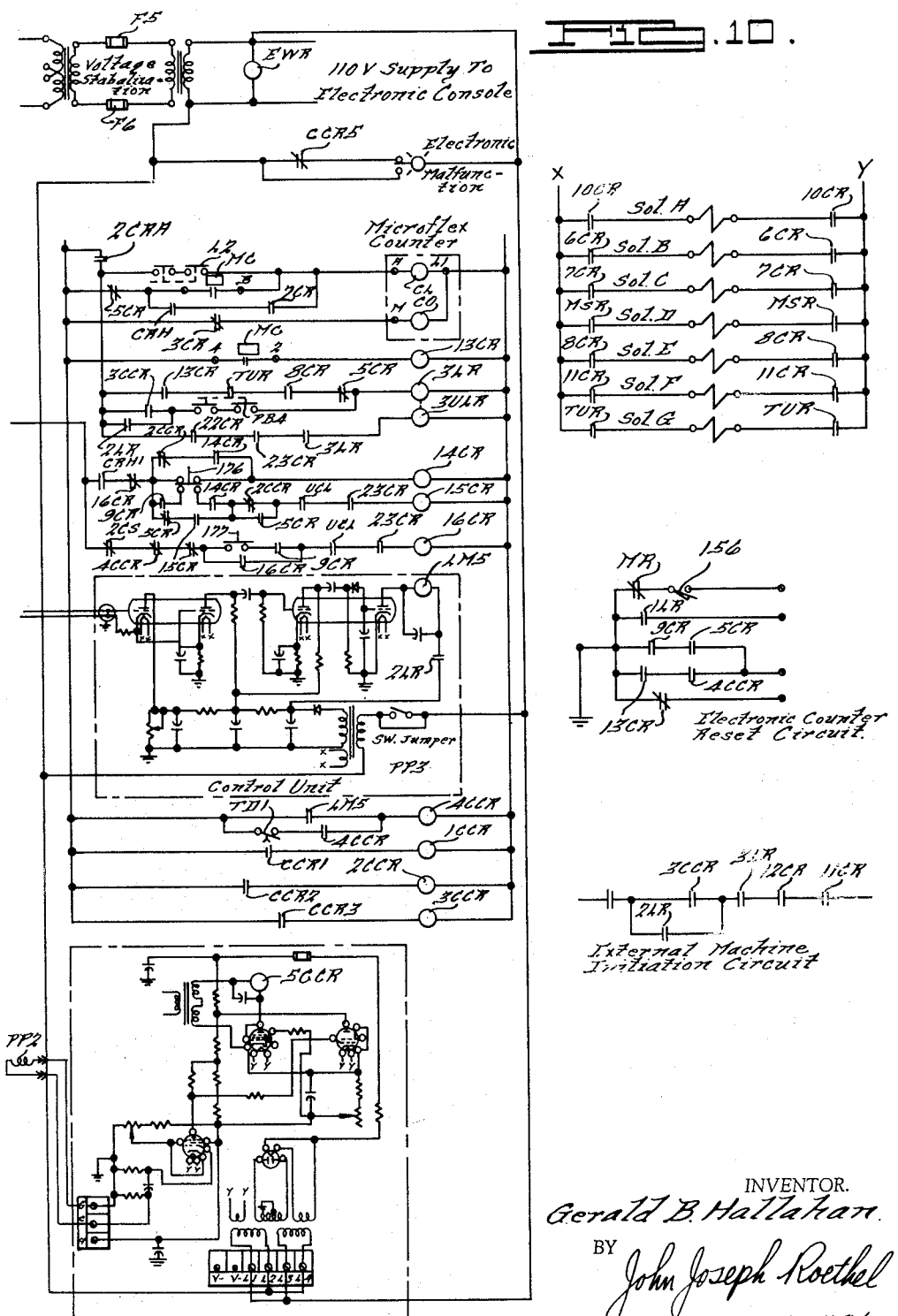

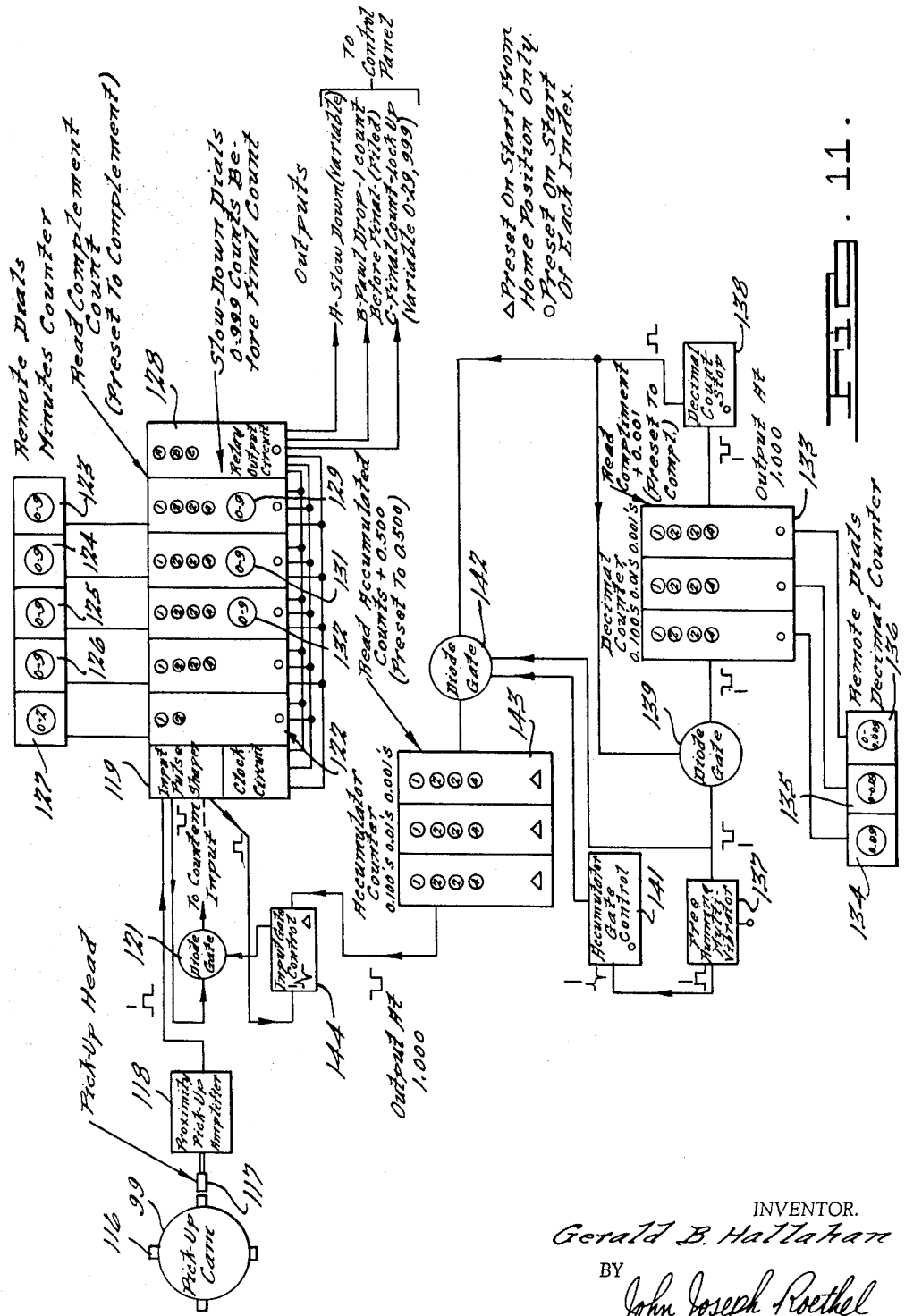

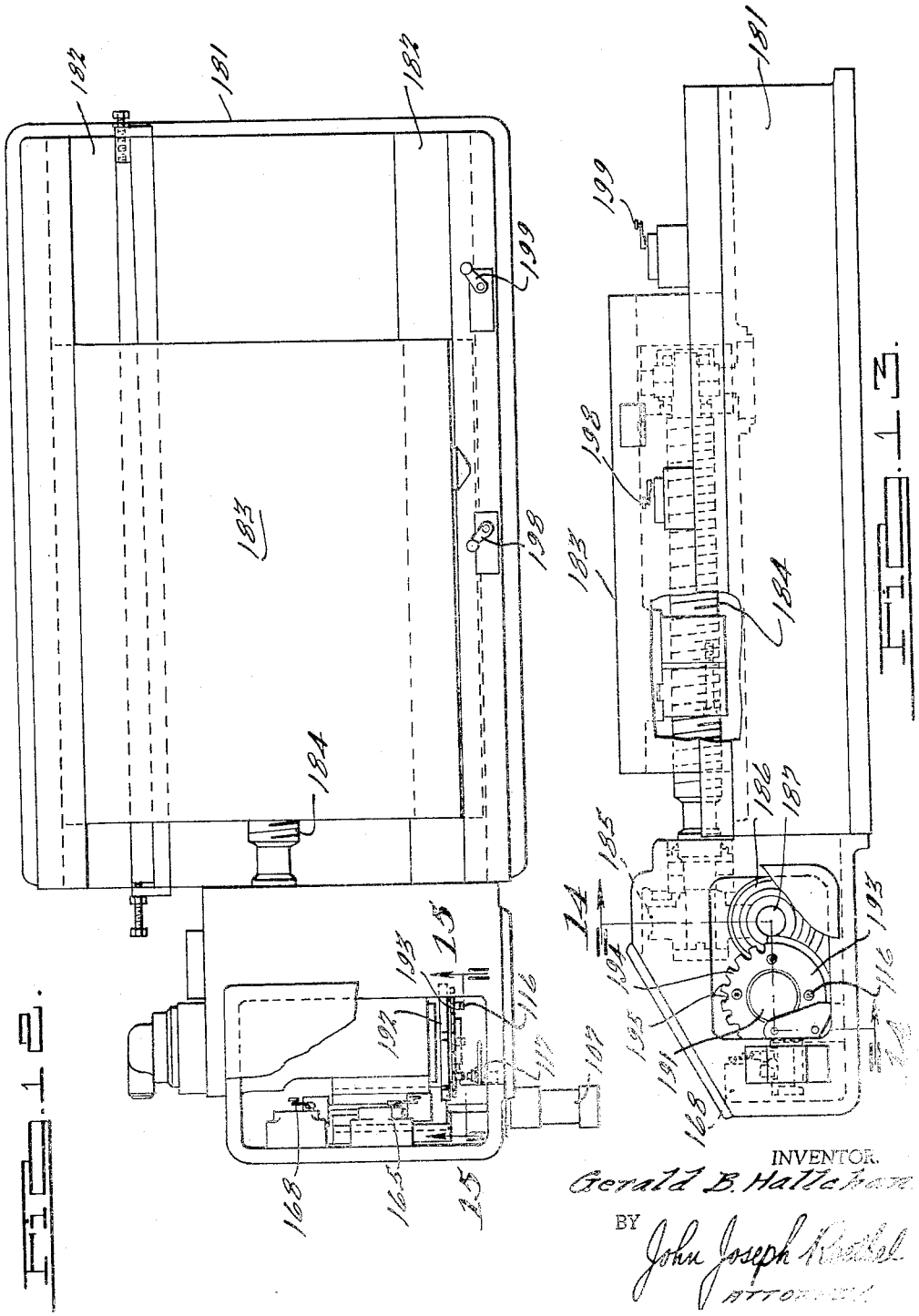

Nov. 8, 1960  G. B. HALLAHAN  2,959,074
INDEXING TABLE AND CONTROL THEREFOR
Filed June 25, 1958  10 Sheets-Sheet 10
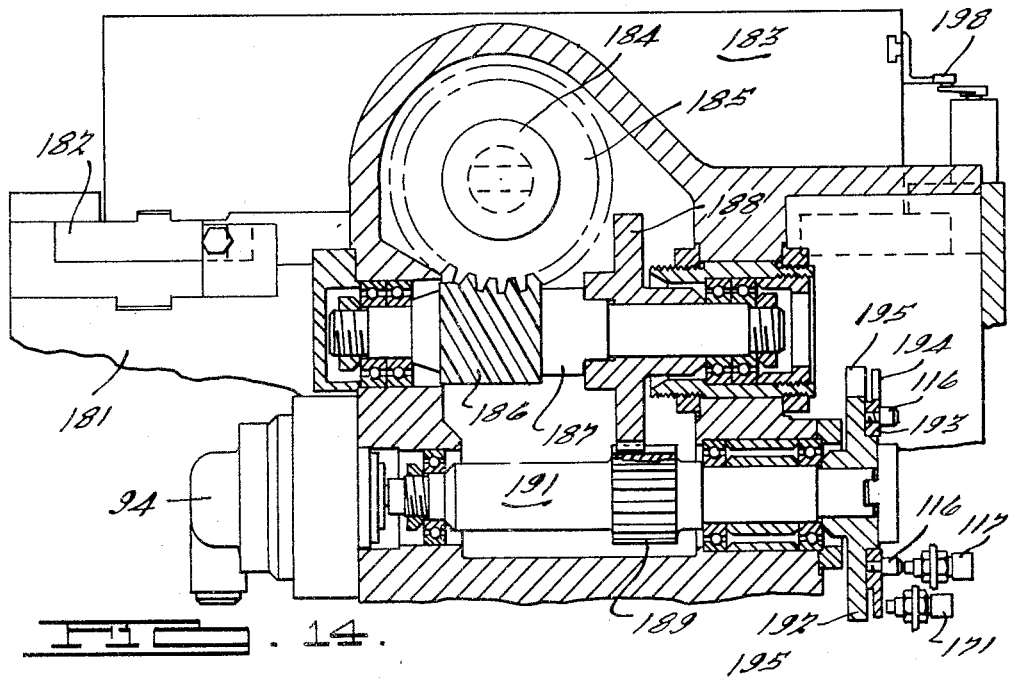
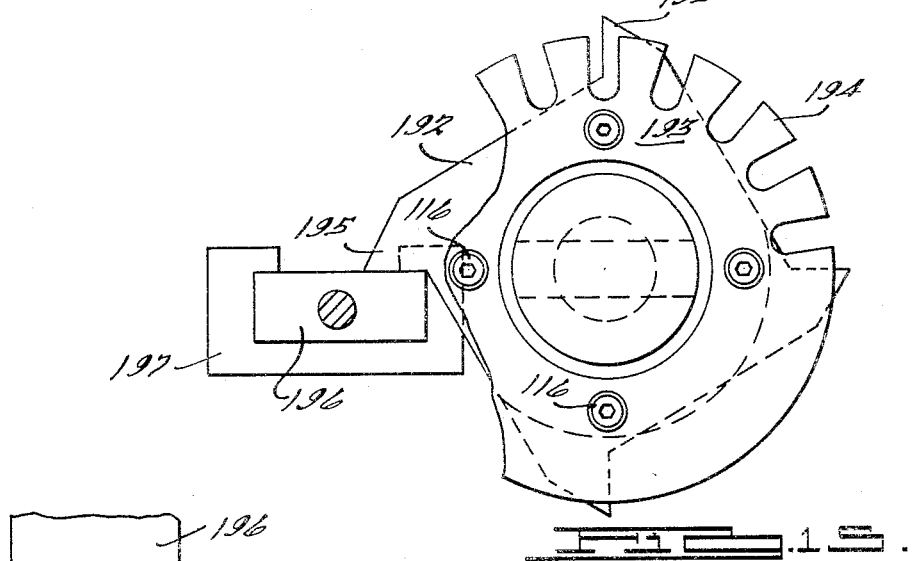
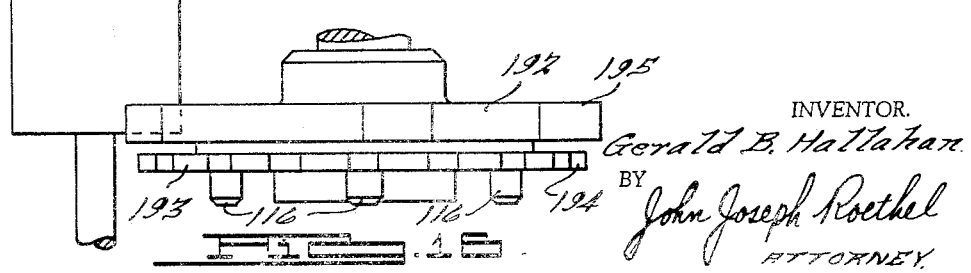
INVENTOR.
Gerald B. Hallahan
BY John Joseph Roethel
ATTORNEY United States Patent Office 2,959,074
Patented Nov. 8, 1960

2,959,074

INDEXING TABLE AND CONTROL THEREFOR

Gerald B. Hallahan, Southfield Township, Oakland County, Mich. (1695 Twelve Mile Road, Berkley, Mich.)

Filed June 25, 1958, Ser. No. 744,584

6 Claims. (Cl. 74—821)

This invention relates to a machine tool indexing table embodying an electronically controlled indexing mechanism.

In general, the present invention embodies a work supporting unit comprising a work supporting table movably supported on a base structure, a drive means for moving the work supporting table relative to a work performing tool unit, and a control system effective to control the operation of the drive means whereby the workpiece may be accurately indexed or moved to pre-selected positions relative to the tool unit. Two embodiments of the invention are exemplified. In one the work supporting table is mounted for rotary indexing movement and in the other the table is mounted for rectilinear indexing movement.

More particularly, the present invention relates to an electronically activated control system for controlling the indexing movement of an indexable work supporting means. The control system comprises an electronic pulse generating means operatively associated with the indexable work supporting means. Each increment of movement of the work supporting means is accompanied by the generation into an electronic circuit of an input pulse. The input pulse is received by a pulse counter which is adapted to generate an output pulse after having received a pre-determined number of input pulses. The output pulse is effective to trigger an appropriate electrical relay means and thereby cause actuation of mechanism effective to halt movement of the indexable work supporting means. Provision is made in the electronically activated control system for causing the indexable means to be slowed down in its indexing movement at a predetermined count before the final count so that it approaches its index position at a decelerated rate. Provision is also made for the means locking the indexable means at the index position to start its movement into lock-up position on a count before the final count thereby ensuring that the lock-up means will be in final position at the final count.

An important feature of the present invention is the provision made for the correction or minimization of the error resulting when the desired indexing movement is an irrational number of increments, that is, the desired indexing movement comprises a whole number of increments plus a fractional portion of an increment. The electronic control circuit is provided with a means for accumulating unused fractional increments of movement so that when such accumulated fractional increments add up to a whole unit, the indexable means is automatically required to move an additional increment of movement. Without anything further, the indexable means can never be more than .99 of unit of movement off true position. By pre-imposing a half unit in the error accumulator, the deviation from true position is shifted so that the indexable means is never more than a plus one-half or minus one-half an increment of movement off true position. Since, in the embodiment of the invention relating to a rotary indexable means, the increment of movement is one minute of arc, the error never exceeds a maximum of one-half minute of arc off true position.

The automatic indexing principle exemplified by the machine tool indexing table embodying the present invention is of such a nature that the indexing table is particularly applicable to such machine tools as boring mills, jig borers, radial drills, milling machines, slotters and drilling machines especially when such machines are desired to perform the same operation in a repetitive pattern at a plurality of locations on a workpiece. It is an object of the present invention to provide a machine tool indexing table embodying an indexing mechanism which does away with the need for multi-hole bushing plates normally used on circular rings, diameters, or the like on any circumferential, single spindle machining operation. By eliminating the use of conventional index plates, much time may be saved in the changeover of the machine from job to job. The versatility of the particular machine tool is greatly improved and the machine is more readily adaptable for use on either long or short production runs. Also, the cost of retooling to accommodate design changes is minimized at least to the extent that the cost of a new index plate is eliminated.

Further objects, advantages and features of the present invention will be apparent from the following description taken in conjunction with the accompanying drawing, wherein:

Fig. 1 is a perspective view of the machine tool indexing table embodying the present invention;

Fig. 2 is a perspective view of the control cabinet housing the electronic components controlling the indexing program;

Fig. 3 is a plan view in part sectional illustrating the mechanical components of the indexing system;

Fig. 4 is a sectional view taken substantially through line 4—4 of Fig. 3 looking in the direction of the arrows;

Fig. 5 is a sectional view taken substantially through line 5—5 of Fig. 3 looking in the direction of the arrows;

Fig. 6 is a sectional view taken substantially through line 6—6 of Fig. 3 looking in the direction of the arrows;

Fig. 7 is a sectional view taken substantially through line 7—7 of Fig. 3 looking in the direction of the arrows;

Fig. 8 is a diagrammatic representation of the hydraulic circuit of the indexing table embodying the present invention;

Figure 9:
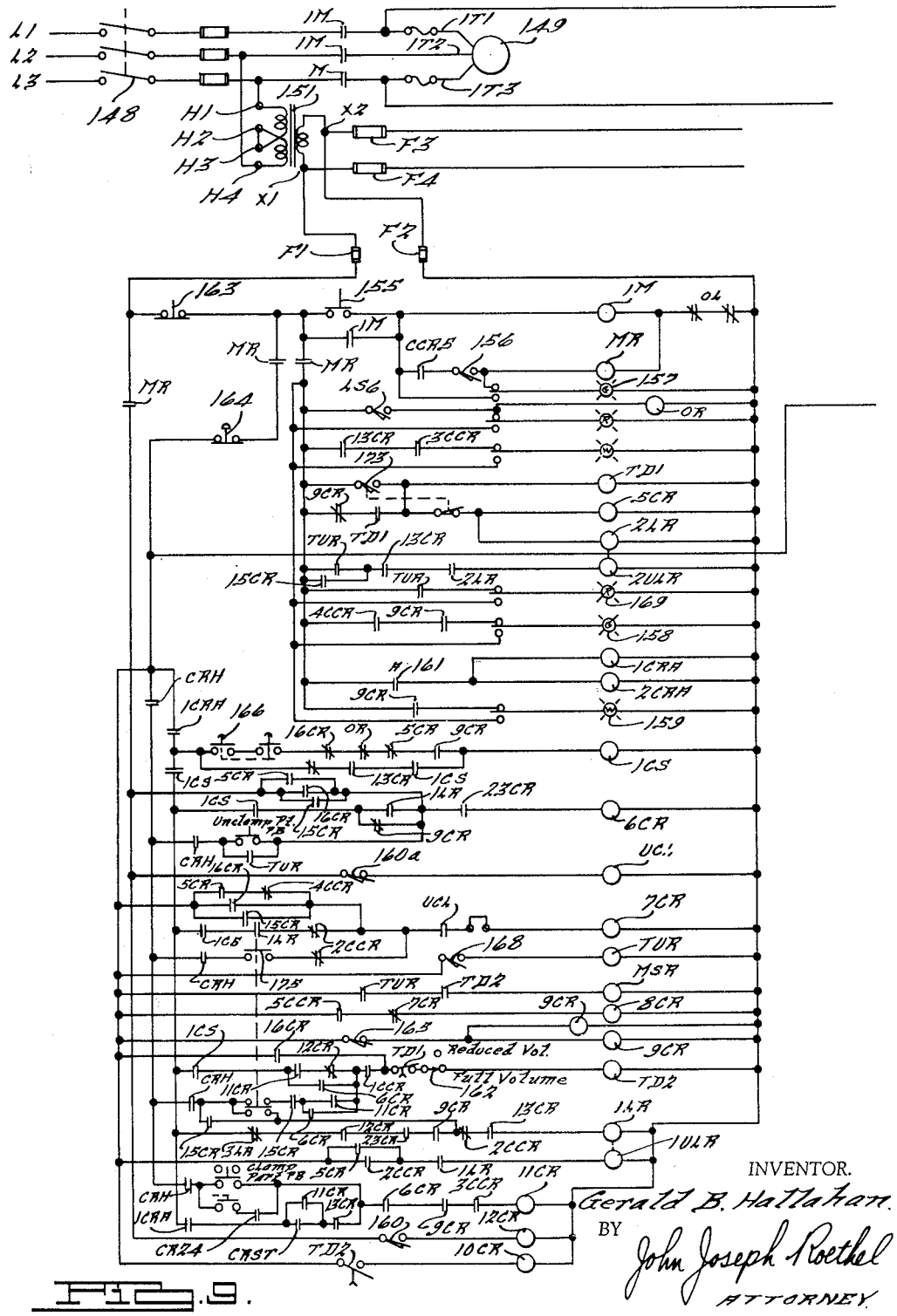

Fig. 9 and Fig. 10 comprise diagrammatic representations of the electrical circuitry of the present invention;

Fig. 11 is a diagrammatic representation of the electronic circuitry used in the present invention;

Fig. 12 is a plan view in part fragmentary illustrating the principle of the present invention as applied to a rectilinearly movable indexing table.

Fig. 13 is a side elevation in part fragmentary of Fig. 12.

Fig. 14 is an enlarged sectional view taken substantially through line 14—14 of Fig. 13 looking in the direction of the arrows.

Fig. 15 is an enlarged end elevation of a part of the mechanism looking in the direction of the arrows 15—15 of Fig. 12.

Fig. 16 is a plan view of Fig. 15.

Before explaining in detail the present invention, it is to be understood that the present invention is not limited in its application to the details of construction or arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawings, the physical aspects of the first of the two embodiments of the present invention to be herein described is illustrated in Figs. 1 to 7, inclusive. The first embodiment comprises an elongated substantially rectangular base 21 which is divided into two compartments. The forward compartment 22 is adapted to partially contain and support a circular index table, generally designated 23, and the rear compartment 24 is provided to house the table rotating or driving mechanism, generally designated 25.

The forward compartment 22 is provided with a centrally located boss 26 bored to receive a center post 27 about which the index table is adapted to turn. The forward compartment is also provided with an upstanding circular rib 28 which has secured to its upper surface a circular wear strip or ring 29 which slidably supports the index table. The forward compartment 22 is provided with an additional circular rib 31 interposed between and concentric with the center boss 26 and the circular rib 28. The boss 26 and ribs 28 and 31 are connected by laterally extending ribs 32, all of which combine to provide the necessary structural reinforcement.

The index table 23 is a circular member preferably cast from a special fine grain cast iron known as "Meehanite." The table member 23 is provided with a center boss 34 bored to receive a center bushing 35 adapted to receive the center post 27 carried by the base boss 26. The peripheral edge of the table 23 is defined by a cylindrical wall 36. Interposed between the center boss 34 and the wall 36 is a circular reinforcing rib 37. The center boss 34, the rib 37 and the wall 36 are connected by additional radially extending reinforcing ribs 38.

The peripheral wall 36 of the table member 23 is provided with an annular flange 39 which is machined to provide gear teeth forming a worm gear 41 engageable by a dual lead worm 42 which is part of the drive mechanism 25, as will be hereinafter explained.

The lower surface 43 of the wall 36 and flange 39 slidably engages the upper surface 44 of the wear strip or ring 29 and it is these surfaces 43 and 44 which are the contact or load bearing surfaces between the base 21 and the index table member 23.

The upper surface 45 of the base 21 has secured thereto segmental gibs 46 forming a ring around the table member 23, the gibs overlying the upper surface of the table member annular flange 39. Secured to the upper surface of the gibs 46 by a wiper retainer 47 is a neoprene wiper ring 48 which abuts the outer surface of the table wall 36 and suitably prevents foreign matter from dropping between the gibs 46 and the adjacent table surfaces.

As has been briefly mentioned, the table member 23 is rotatably driven through the worm gear 41 and worm 42. The worm gear teeth are carried by the flange 39 of the index table member 23 and the worm 42 is formed as an integral part of a shaft 49 journalled in a worm carrier 51. As best seen in Figs. 5 and 6, the worm carrier 51 comprises a base or platform member 52 supported on suitable pads located on the upper surface 53 of the floor 54 of the base rear compartment 24. The locating means comprises two keys 55, see Fig. 5. The securing means comprises suitable gibs 56 and hold down bolts 57. The hold down bolts 57 project through slotted pads 58 in the platform member 52, the slots providing for the adjustable positioning of the platform member, as will be readily understood.

The worm carrier 51 has at one side thereof an elevated substantially cylindrical portion 59, having an axially extending hole 61 therein, within which the worm shaft 49 is journalled. The wall of the cylindrical portion 59 is cut away, as at 62, and exposes the hole 61, see Fig. 5. The worm 42 projects through the opening thus provided into engagement with the worm gear 41 (see Fig. 4). At its end 63 the worm shaft 49 is provided with a stepped portion which receives a pair of bearings 64. The bearings 64 are held on the shaft end by a locknut 65 threaded thereon. The outer bearing races are seated within an adaptor or bushing 66 fitted within the end portion 67 of the cylindrical portion 59. The adaptor or bushing 66 has bolted thereto a cap 68 which is engaged by a pressure device, generally designated 69.

The function of the pressure device 69 is to exert a yieldable thrust force on the cap 68 supporting the bearings 64 journalling the end 63 of the worm shaft 49. The pressure device 69 comprises a spring support stud 71 axially aligned with the worm shaft 49 and bolted onto a pad 72 located on the side wall 73 of the base rear compartment 24. The spring support stud 71 is threaded for a part of its length to receive a pair of spanner nuts 74. Carried by the spring support stud 71 is a compression spring 75 which at its one end abuts the spanner nuts 74 and at its other end carries a spring cap 76 adapted to bear against the cap 68. The spanner nuts 74 permit the pressure of the compression spring 75 to be adjusted as desired.

Should the indexing table jam for any reason while the worm 42 continues to rotate, the pressure device permits the worm shaft 49 to move longitudinally to the left as viewed in Fig. 3. It will be noted that the bearing support bushing 66 is slidable in the worm carrier housing. Were it rigidly mounted, the worm 42 would continue to try to force the rotation of the table 23. With the pressure device 69 acting against the support cap 68, as soon as the table encounters resistance to movement great enough to force the worm shaft 49 to the left with sufficient force to overcome the spring 75, the pressure device 69 will yield. The yielding point is, of course, set below the point at which serious damage to the jammed parts of the index table or the workpiece or whatever is causing the difficulty, can occur. To further ensure that no damage to the mechanism can occur, an overload safety switch 70 operable by an operating cam 70a is provided, the cam being coupled to the bearing support bushing 66 for movement therewith.

The worm shaft 49 is rotatably journalled at its end 77 in bearings 78 carried by the cylindrical portion 59. Outboard of the bearings 78 the shaft 49 is provided with an extension 79 carrying a gear 81. The gear 81 is keyed to the end 79 of the shaft 49 and retained thereon by a combination end key and cap device 82, the latter being bolted to the end face of the shaft. The gear 81 is in mesh with the gear 83 of an idler shaft 84 journalled in suitable bearings 84a in a housing portion 85 of the worm carrier 51. The idler shaft 84 has secured to the outboard end thereof an idler gear 86, the idler gear being keyed to the shaft and retained thereon by a combination key and cap device 87 which is bolted to the end face of the shaft.

The idler gear 86 is in mesh with the gear 88 of a drive shaft 89 rotatably journalled by bearings 91 and 92 suitably retained in a further housing portion 93 of the worm carrier 51. A fluid motor 94 is bolted to one end face of the housing portion 85. The motor shaft 95 is suitably coupled to the end 96 of the drive shaft. The bearings 91 supporting the ends 97 of the shaft 89 are retained within the housing portion 93 by a retainer cap 98.

It will be noted that the end 97 of the shaft 89 projects beyond the retainer cap 98. The projecting end of the shaft carries an index plate 99, the shape of which is best seen in Fig. 6. The index plate is retained on the shaft 89 by a combination key and cap retainer device 101 bolted to the end face of the shaft. The index plate 99 is provided with four equally spaced lobes 102 whose function will be hereinafter explained.

The fluid motor 94 is driven by hydraulic fluid furnished by a hydraulic pump 103 (shown diagrammatically in Fig. 8) located externally of the index table base 21.

Briefly restated, the drive of the index table 33 by the hydraulic motor 94 is through gear shaft 89, idler gear 86, gear shaft 84, idler gear 81, worm shaft 49 and worm 42.

As best seen in Figs. 3 and 6, the lobes 102 of the index plate 99 are adapted to be engaged by a slidable dog or index pawl 104. The index pawl is a substantially rectangular member which is slidably journalled in a pawl block 105. The pawl block 105 is bolted to the side of the worm carrier housing portion 93. It will be noted that the pawl 104 is slidable in a direction parallel to the longitudinal axis of the shaft 89. The pawl 104 is retained within the pawl block 105 by gibs 106 bolted to the pawl block. The pawl 104 is driven into and out of the path of the index plate lobes by a hydraulic cylinder mechanism 107. The piston rod 108 of the hydraulic cylinder mechanism has coupled thereto an elongated index pawl rod 109 provided at the free end thereof with a cap portion 111. The cap portion projects into an elongated hole 112 in the pawl into abutting relation to one end of a compression spring 113. The exertion of the driving pressure on the pawl through a compression spring permits overtravel of the hydraulic cylinder mechanism even when forward motion of the pawl 104 is prevented by engagement of an abutment 114 thereon with the end of the pawl block 105. Also, should the timing of the forward movement of the pawl 104 be off so that the pawl abuts a side face of a lobe rather than moving into the space between lobes, the spring 113 will be compressed until the obstructing lobe is out of the path of the pawl. The pawl 104 is provided with an end cap 115 against which the index pawl rod cap portion 11 abuts to retract the pawl 104 from the path of the index plate lobes.

The description to this point relates to the physical structure of the embodiment of the invention which is illustrated in Figs. 1 to 7 inclusive. It will be noted that various limit switches and limit switch dogs as well as other unidentified control elements appear in the various views. The operation of the index table mechanism and the function of the various limit switches, control elements and the like as well as the principles on which the present invention is based will be explained with reference to the several circuit diagrams presented in Figs. 8 to 11, inclusive.

Before explaining the description of the operation of the machine in terms of the diagrams, it should be explained that the symbols are according to JIC (Joint Industrial Conference) standards. For example, Fig. 8 is a diagrammatic representation of the hydraulic system and circuit of the prototype indexing table of the present embodiment. However, even without reference to a JIC chart, it is believed that the meanings of the various symbols will become readily apparent as the description proceeds.

Figs. 9 and 10 comprise a diagrammatic representation of the electrical circuitry connected with the present embodiment. With reference to this circuit or wiring diagram, a brief explanation here may obviate the necessity of referring to any reference charts. The small circles on the lines represent control relay coils when identified by the letters CR (Control Relay). The letters CR are prefixed by a reference numeral to identify a particular relay coil, for example, 1–CR. The vertical parallel spaced lines interrupting the diagram lines, which spaced lines are also identified by the letters CR followed by a numeral, represent the contacts of the control relay. It will be noted that the same control relay may affect more than one circuit and therefore the same contact identification may appear in more than one place on the diagram. The parallel spaced lines represent normally open contacts. A diagonal line through the parallel lines represent normally closed contacts. Various push-buttons, limit switches, control lights and the like are also shown. Although some of the control relays and the like are identified by numerals or code designations, only those deemed directly necessary to an understanding of the operation of the indexing mechanism above described will be specifically referred to herein. The others relate to certain interconnections between the indexing table and other components of the machine tool, whatever its nature, to be associated with the indexing mechanism.

The last circuit diagram presented comprises Fig. 11 and this diagram represents the electronic brain which controls the operation of the indexing table mechanism. Briefly stated, the electronic brain comprises a digital counting device adapted to count increments of movement of the index table as it rotates from station to station, or, in other words, is indexed.

As has been previously described, the hydraulic motor 94 drives the index table member through a gear train ending with the worm 42 and the worm gear 41. In the present embodiment, the gear ratio between the shaft 89 coupled to the motor 94 and the index table member is 5400:1. Since there are 21,600 minutes of arc in a 360° circle, each revolution of the motor driven shaft 95 results in a movement of the index table member 33 through an arc of four minutes. As was also described, the drive shaft 89 carries at one end thereof an index plate 99. The index plate (which may also be known as a pick-up cam) was described as having four equally spaced lobes 102 thereon. Adjustable with reference to the leading edge of each lobe 102 through a piloted retainer plate 100 is an axially projecting button 116. As the index plate rotates, each button passes through the electro-magnetic field of a proximity pick-up head 117. (See Figs. 3 and 11.) Since there are four equally spaced buttons 116, the buttons pass through the proximity field at a frequency of one button for each quarter revolution of the index plate. As each button passes through the magnetic field of the proximity pick-up head 117, a pulse is generated. By counting the number of pulses it is thus possible to measure the movement of the table member 23, the unit or increment of measure being a minute of arc for each pulse generated.

Referring now to Fig. 11, it will be noted that the pulse is amplified by a promixity pick-up amplifier 118 and is given a desired form by an input pulse shaper 119. The pulse then passes through a diode gate 121 into the basic digital counter unit, generally designated 122.

Since the increment of movement measured comprises one minute of arc, the basic digital counter unit 122 must have a capacity to count at least 21,600 minutes of arc, the number of minutes of arc in one revolution of the index table or 360°. Accordingly, the digital counter comprises basically five decades in tandem, each decade being pre-set by a remote button at the machine instrument panel. The buttons are designated in Figs. 2 and 11 as 123, 124, 125, 126, and 127. For example, should it be desired to set the system so that the index movement will be eight minutes of arc, button 123 would be depressed eight times. For a movement of seventy-eight minutes of arc, button 124 would be depressed seven times and button 123 eight times; and so on. It should be noted that button 127 may be depressed a minimum of zero or a maximum of two times since this decade does not have to count in excess of two units of ten thousand minutes. Although the digital counter unit 122 is only required to be able to count to at least 21,600 minutes or pulses, it will be readily apparent that its actual range is from 0 to 29,999 minutes.

Immediately to the right of the digital counter 122 is shown an additional diagram block 128 which is labelled "Relay Output Circuit." The box contains three small circles containing the letters A, B and C. These circles represent lamps which when lighted indicate the condition of the relay circuits which control respectively: A— the slow down or deceleration of the index table as it approaches the end of an index movement; B—the pawl movement toward index plate lock-up position; and C— the final count on which the lock-up of the index plate occurs.

With regard to the slow down or deceleration of the index table, the decades controlled by the buttons 123, 124 and 125 are shown provided with three dials 129, 131 and 132, respectively. By the appropriate setting of these dials, the slow down or deceleration of the index table may be brought into effect at any pre-determined count from 0 to 999 counts before the final count. With regard to the index plate lock-up position, the pawl 104 moves into full lock-up position one count before the final count.

With the present system, if it were desired to divide a circle in ninety equal spaces, the division would be 21,600 divided by ninety or 240 minutes. This would be considered a rational number and the system would accurately control the index table 23 movements so as to index the table 240 minutes per index. The machine operator would merely have to depress the button 125 twice; the button 124 four times and not touch the button 123. For any rational number, that is, any number evenly divisible into 21,600, the index movement is controllable merely by setting the dials 123 to 127 inclusive. If the number of divisions is rational, the table will be indexed into true position at all times.

Any number not evenly divisible into 21,600 is considered an irrational number. For example, if it is desired to divide a circle into ninety-two equal spaces the result is an irrational number. Twenty one thousand six hundred divided by 92 equals 234.783 minutes. The machine operator would have to depress the decade buttons of the minutes counter either to give 234 minutes or 235 minutes. If the buttons are depressed to give a setting of 234 minutes the first index movement will be short of the required movement by .783 minutes. At the second index movement the error would have accumulated to 1.566 minutes. It will be readily apparent that by the time the last index movement had occurred a sizable negative error would have accumulated. Should the initial dial setting be 235 minutes the index table would over-travel .217 minute each index with equally undesirable effects.

Accordingly, an important feature of the present invention is the incorporation in the system illustrated in Fig. 11 of a means which will automatically introduce a correction factor into the count whenever the desired circle division is an irrational number.

This is accomplished by including in the system illustrated in Fig. 11 an auxiliary digital decimal minutes counter generally designated 133. The count of this counter is controlled by three buttons designated 134, 135 and 136. Button 134 may be depressed to give a setting for .0 to 0.9 minute; button 135 for .00 to 0.09 minute and button 136 for .000 to 0.009 minute. Thus the operator in setting up the machine to index for 92 divisions or 234.783 minutes would depress the buttons of the system as follows: Digital counter button 125 twice, button 124 three times and button 123 four times and then auxiliary digital decimal minutes counter 133, button 134 seven times, button 135 eight times and button 136 three times.

The foregoing may perhaps be more readily understood with reference to Fig. 2 which shows the control console. The console top contains the various controls, test lights and two sets of numerals readout lights which are called "Nixies." Programming is visually recorded numerically on both sets of "Nixies" in terms of minutes and decimal minutes of arc. The example set forth above in which a machining operation is required at 92 equally spaced points around a circumference may be illustrated as follows: From a chart the operator determines that the number of minutes and decimal minutes of arc required for each index is 00234.783. This is punch keyed into both sets of "Nixies" by depressing the button adjacent to each bottom "Nixie" a number of times equivalent to the number wanted, i.e., button 127 zero; button 126 zero; button 125 twice; button 124 three times; button 123 four times; button 134 seven times; button 135 eight times; and button 136 three times.

When indexing starts, the decimal minutes of arc in the upper row of "Nixies" are transferred to the "accumulator" (to be hereinafter explained) decades in the console and computed. The "accumulator" decades carry a running total of any remainders, and the index error on any irrational indices is limited to a total of 30 seconds of arc by discreet discrimination within the electronic computing system, as will be explained. The upper row of "Nixies" record the mechanical progress of each index and re-set automatically. The "Nixies," bottom row, hold the pre-set figure of 00234.783. These or any set of figures punch-keyed into the numerical control system cannot be disturbed during an automatic operating cycle as the controls are locked out electrically.

For convenience the digital decimal minutes counter 133, comprising the three decades controlled by the push buttons 134, 135 and 136, is labelled the decimal counter and will be referred to as such.

Referring to the lower portion of Fig. 11, it will be noted that the decimal counter is in series with a free running multi-vibrator 137. The decimal counter 133 receives its impulses from the multi-vibrator and counts off a number of pulses as determined by the depressing of the decimal counter buttons 134, 135 and 136. When the required number of pulses have been delivered to the decimal counter an output pulse is delivered to the decimal counter stop 138 which in turn causes the diode gate 139 between the multi-vibrator 137 and the decimal counter to close preventing any more pulses feeding into the decimal counter.

At the same time the multi-vibrator is delivering pulses into the decimal counter diode gage 139, it is also delivering a like number of pulses into an accumulator counter gate control 141 leading to an accumulator counter diode gate 142 and then to an accumulator counter 143.

It should be repeated that the decimal counter 133 is reset at the start of each index cycle. At the start of the index movement the decimal portion of the index movement setting is again fed into the system. It is the function of the accumulator counter to accumulate or totalize the decimal portions until a predetermined condition is created at which time the accumulator feeds an additional pulse into the digital counter.

For example, going back to our exemplary division of a 360° circle into 92 divisions, each division being 00234.783 minutes, the machine operator would set the "Nixies" 0—0—2—3—4—7—8—3. At the completion of the first index movement the index table would have moved 234 minutes. The .783 minute of unused movement would merely be represented by the impulses fed into the accumulator counter 143 by the multi-vibrator 137. The positioning of the index table would be .783 minute short of a true position. However, at the start of the next index movement, the decimal counter and decimal count stop having been automatically reset would permit an additional 783 impulses to be fed into the accumulator. As soon as a sufficient number of impulses are fed into the accumulator to total 1000 impulses, an output pulse is sent to the input gate control 144. In effect, the output pulse fed into the input gate control causes the diode gate 121 to be momentarily closed blocking the passage of one input pulse from the pick-up 117 thereby requiring one more input pulse from the pick-up to perform its output functions than are set on the remote dials of the minutes counter or digital counter 122. Thus, on the first index movement the table 23 will travel only 234 minutes, being out of true position by minus .783 minute. On the second index movement the table will travel 235 minutes (234 minutes plus one additional minute resulting from the compensation for the one blocked input pulse). At the completion of the second index movement the true position of the table should be 469.566 minutes from starting position. The actual position of the table is 469 minutes (234 minutes plus 235 minutes) the error now being minus .566 minute off true position. The 566 impulses corresponding to the .566 minute error is stored in the accumulator counter 143 and at the start of the third index an additional 783 impulses are fed into the counter 143. As soon as the count reaches 1000 another output impulse is sent into the input gate control and again the pick-up is required to supply 235 input pulses.

At the completion of the third index movement of the table 23 its true position should be 704.349 minutes from its zero or starting position. The actual position is 704 minutes from zero, the error now being minus .349 minute, the error being represented in the accumulator counter 143 by 349 stored pulses.

A point will be reached at which the number of pulses stored in the accumulator counter 143 plus the number of new pulses added thereto at the start of an index cycle does not add up to 100 pulses and the table again will only move 234 minutes. This actually occurs on the fifth index in our exemplary problem. At the end of the fourth index movement the true position of the table 23 should be 939.132 minutes from zero. The actual position is 939 minutes from zero, the table being out of true position by a minus .132 minute. At the start of the fifth index the 132 impulses stored in the accumulator counter 143 plus the 783 impulses added thereto only total 915 impulses so that no output pulse is transmitted to the input gate control 144. The table on the fifth index will only move 234 minutes. Its true position at the completion of this index should be 1173.915 minutes from zero. Its actual position is 1173 minutes and the error is minus .915 minute.

As just described, the error may be from 0 to .999 minute off the true position. However, as will be shown, the error may be averaged so as to never exceed .500 minute, that is, thirty seconds of arc. This may be done by the simple expedient of pre-setting into the accumulator counter 143 a factor equal to the average minus error of the system. In other words, since the system hereinabove described has an error range of minus 0 to 0.999 minute, by pre-setting the counter to plus 0.500 minute, the range is shifted so that it never exceeds 0.500 minute or 30 seconds of arc off the true position.

This error in relation to starting position will always be in a given direction from true position at any given position. It may be plus on a number of positions and minus on a number of positions in relation to true position but the error will always be in the same direction and at the same value at any given repeated position.

This may be illustrated by using our exemplary problem of a 360° circle having 92 divisions, each division being equal to 234.783 minutes. At the start of the first index the "Nixies" are set at 0—0—2—3—4—7—8—3 and the accumulator counter already has 500 impulses stored therein. As soon as the index cycle is initiated 783 impulses are fed by the multi-vibrator into the accumulator counter. However, only 500 of these are required to cause an output impulse to be transmitted to the input gate control 144. Thus, on the first index movement the table 23 moves 325 minutes, having overtravelled .217 minute beyond its true position. On the start of the next index cycle an additional 783 impulses are added to the 283 impulses stored therein after the first index cycle. Since this totals more than 1000 impulses, another output impulse is transmitted to the input gate control 144 and again the table must travel 235 minutes to satisfy the count. The true position of the table at the completion of the second index movement should be 469.566 minutes. Its actual position is 470 minutes, or it has overtravelled .413 minute. However, at the start of the third index the accumulator counter 143 has only 66 impulses stored therein and the addition of another 783 is insufficient to cause another output pulse to be transmitted to the input gate control 144. On the third index the table will travel only 234 minutes. On the completion of the third index the true position of the table 23 should be 704.349 minutes. Its actual position is 704 minutes, an error of minus .349 minute.

Thus, by pre-setting the average inherent error of the system into the accumulator counter 143 by pre-setting 500 pulses (equal to plus 0.500 minute) into the counter, the actual error never exceeds a maximum 0.500 minute of 30 seconds of true position. The range of error remains the same but it has been shifted to span the true position so as to have half the total error on either side of the true position rather than to be on one side thereof at all times.

To briefly summarize what has been described above, when the required number of divisions of a circle or an arc results in an irrational number, the correction is obtained by totalizing the remainder or decimal portions of the number as the cycle of index movements occurs. When the totalization or accumulation has reached unity or one minute, the digital counter automatically requires an additional count or input pulse to be satisfied, one count having been blocked by the output pulse from the accumulator counter 143 to the input gate control 144. Further, the accumulator counter circuitry functions to examine the remainder of decimal portion and if found to be greater than .5 minute, the additional count or pulse is required to satisfy the digital counter. If the remainder is less than .5 minute, the whole integers remain unchanged. Thus, the table position for all irrational numbers is always maintained within 30 seconds or .5 minute of true position.

In normal operation where a number of indexes per revolution are required to be made, the electronic control system incorporates reset circuitry for resetting all elements properly on start from the home position. This resetting operation occurs immediately upon operation of the initiating control in the associated control circuitry. Immediately upon the resetting a count is fed into the decimal counter 133 and the accumulator 143 in accordance with the correction factor set on the remote dials of the decimal counter, as has been described in detail. If the accumulator passes an output signal a pulse is fed into the input gate control 144 establishing the condition that requires one more pulse from the pick-up 177 than is set on the remote dials of the minutes mounter 122.

The entire reset operation is designed to occur in a time interval less than the time interval required between the initiation of the control equipment and the start of rotation of the motor drive.

After leaving the home position and indexing to the first position, the accumulator counter will continuously accumulate error signals as dictated by the decimal counter 133 for each index. The function of the input gate control will be determined by the accumulator counter until the equipment has returned to the home position and a new sequence is started from the home position. Legends on Fig. 11 indicates the pre-set conditions on the various electronic units.

The end accuracy of the foregoing system is determined solely by the ability to electrically and mechanically control the final position of the index or other mechanism controlled from the electronic control system.

Having explained the principle of the electronic indexing control system, the operation of the indexing table mechanism will now be explained in terms of the electric and hydraulic circuits involved.

After having set the increment counter to establish the desired number of minutes per index, the operator must next make the index counter setting at the main control station. The index counter is set by means of a setting knob 145 which must be unlocked by means of a knurled lock nob 146 at the center of the dials 147. After unlocking the setting knob it must be revolved clockwise for the number of indexes indicated by the spacing requirements of the part. One revolution of the knob 145 equals twenty indexes, and the small inner dial is graduated into twenty equal spaces. The outside summation dial also moves to 20 on the first revolution of the knob. The two revolutions of the setting knob record 20 on the small dial and 40 on the summation dial, and so on. The total number of indexes is a summation of both the large and small dial readings. After the setting is made the dials are locked with the knurled locking knob 146.

The setting of the index counter may be altered only if all the counts of the previous setting have been satisfied, which resets the counter, and only when the machine elements are stationary.

Both the increment counter and the index counter are automatically reset at the home or starting position of the table 23, and this is the normal position at which the settings are altered for a new setting.

The increment counter and index counter having been set as desired, the operator is now ready to start the machine. The source of power to the main transformer is 440 volt, three phase, 60 cycle current. The main hydraulic pump motor 149 is operated directly off this current. However, the electronic console power supply and the various relays and solenoids are operated on 110 volt current, and accordingly, suitable step down transformers 152 and 151 for the respective circuit are provided.

Next the operator must check all machine position indicating lights 153 to assure they are in working order by depressing each light to test it.

The electric motor 149 which drives the hydraulic pump 103 is started when the operator presses the motor start push button 155 to thereby energize motor relay M. R. causing relay contacts 1 M to close (see Fig. 9). It will be noted that the M. R. coil has in series therewith a switch 156 which closes automatically after the electronic console has been properly warmed up. When the electronic tubes are warmed up, a green light 157 labelled "Electronics Operative" will light up. If the table is in home position, a green light 158 labelled "Home Position" will also light up, indicating the normal starting position. A white light 159 labelled "Table Locked" will light up, indicating the stable is locked up. All three of these lights must be on for the start of a normal automatic cycle.

After the machine has been allowed to warm up for a reasonable time, the selector switch 161 is turned to the "Manual" position and the table is indexed home to home twice through the "Slow Index" and "Home Position" controls later described. This completes the warm up operation and ensures that all elements of the machine are in operating condition. The operator then turns the selector switch 161 to "Auto" position and selector switch 162 to the "Full Volume" position.

With reference to Fig. 9, it will be noted that in close relation to push button 155 is shown a push button 163; and, below push button 163 is shown push button 164. Push button 163 is the master stop push button and stops all operations, de-energizing the electronic and electrical panel and stopping the hydraulic pump motor. The emergency stop push button 164 is effective to completely stop all operational elements, including locking up the table drive motor regardless of counter command. However, it does not stop the hydraulic pump motor nor de-energize either the electronic or electrical control.

It will be assumed that in the starting position the workpiece is so positioned on the table that the first machining operation to be performed by the machine tool associated with the index table will take place at the zero index position. Limit switch 165 is closed, as indicated by white light 159, indicating that the fluid motor 94 driving the index table 23 is locked against rotation, or, in other words, that the slide pawl is in engagement with the index plate 99. To start the operation, the operator presses the "Cycle Start" push button 166 energizing the automatic circuit, resetting the increment counter and electrically locking up the index counter for the pre-set number of indexes. Relay 10CR is energized causing solenoid "A" to be energized and the full volume of the pump 103 to be delivered to the hydraulic circuit. Relay 11CR is also energized causing solenoid "F" to be energized to clamp the workpiece in the event that an automatic clamping mechanism is included in the set-up. 3LR relay locks in to prepare the external machine circuit for operation. Limit switch 160 is actuated as the part is clamped and the external machine cycle then is initiated. Actuation of this switch also reduces the pump to low volume output during the machining cycle.

Upon the machining cycle being completed the automatic index cycle is initiated. Solenoid "A" is again energized for maximum pump volume. Solenoid "B" is energized to unclamp the part, and solenoid "F" is de-energized. Limit switch 160a is actuated when the part is unclamped. To initiate the indexing movement it is necessary to unlock the table 23, that is, to withdraw the pawl 104 from the index plate 99. Solenoid "C" is energized causing valve 167 (see Fig. 8) to open causing fluid to drive the hydraulic cylinder mechanism 107 piston in a direction to slide the pawl 104 out of lock-up position with respect to the index plate 99. Complete retraction of the pawl is signalled by the closing of limit switch 168 which indicates the table is unlocked. Actuation of limit switch 168 also energizes solenoid "D" which releases the exhaust oil of the motor and solenoid "G" for mist lubrication. The fluid motor 94 revolves at top speed, and proximity pick-up 117 in the area of the motor shaft pulses the "Increment" counter which counts each quarter revolution of the motor, as has been above described. The limit switch also energizes the "Table Unlocked" light 169.

As the count of the increment counter approaches the pre-set amount previously selected by the operator, solenoid "D" and a timer are de-energized. The main flow of the exhausting oil from the fluid motor 94 is shut off and the motor decelerates. After time out is indicated by the timer, solenoid "A" is de-energized and the pump 103 output is reduced to low volume. The motor 94 continues to revolve at creep speed.

A second proximity pick-up 171 operating in the area of peripheral notches or spokes 172 on the retainer plate 100 diminishes its firing rate when the r.p.m. of the shaft 95 is reduced to a suitable lock-up speed. Should the speed be too fast the lock-up would not be permitted to occur. The action of proximity pick-up 171 prepares the circuit for the final lock-up.

On the last one-fourth revolution, one count before the final count, solenoid "C" is de-energized and solenoid "E" is energized, thereby causing valve 167 to direct fluid to the hydraulic cylinder mechanism 107 to drive the pawl 104 toward the index plate 99. The pawl 104 locks up the fluid motor 94 on the last count and the lock-up is signalled by the closing of limit switch 165, indicating the completion of the index portion of the cycle. Also at this time an index is recorded on the index counter. As limit switch 168 is released, solenoid "G" is de-energized shutting off the mist lubricator. Limit switch 165 is actuated as the table is locked up, de-energizing solenoid "B" and energizing solenoid "F." The last count occurs at this time, and solenoid "A" is energized to restore full pump 103 volume. Clamp cylinders move in to clamp the part. Limit switch also energizes "Table Locked" light 159, Limit switch 160 is actuated as the part is clamped, and solenoid "A" is de-energized. The external machine cycle is also initiated at this time.

The foregoing operations repeat with each machine cycle being followed by an index cycle up to the last pre-set count on the Index Counter.

Assuming the summation of the indexes as originally set on the two counters equals 360 degrees, the automatic cycle would continue as follows: The home position limit switch 173 (see Fig. 3) is actuated as the table approaches the starting position on the last index. A timer is energized, and after time out solenoid "D" and a second timer are de-energized. The main flow of the exhausting oil from the fluid motor 94 is shut off and the motor decelerates. After time out of the second timer solenoid "A" is de-energized and the pump 103 output is reduced to low volume. The motor 94 continues to revolve at creep speed. The speed control proximity pick-up 171 firing rate diminishes when the r.p.m. of the motor shaft 95 is reduced to an acceptable lock-up speed. This action prepares the circuit for final lock-up.

As the table approaches the working area of the third proximity pick-up 174 (see Fig. 3), the home proximity pick-up, limit switch 173 is released, energizing a locking relay, 2LR, which connects the proximity pick-up 174 into the control circuit. At this point control of the indexing is removed from the counter, and the table will return to starting position independently of the counter settings. Also the index counter is reset.

One fourth of a revolution (one count) from home position, proximity pick-up 174 fires, de-energizing solenoid "C" and energizing solenoid "E" to lock up the fluid motor 94. As limit switch 168 is released, solenoid "G" is also de-energized.

Limit switch 165 is actuated as the motor 94 is locked up in home position, and the green light 158 indicating this position is illuminated, completing an automatic cycle. The cycle repeats when the operator re-initiates the cycle start button 166.

The foregoing recited the operation of the indexing mechanism when operated on an automatic cycle. The machine may be operated step by step through a complete cycle by a manual sequencing of push buttons. This "manual operation" may be as follows:

The operator turns the selector switch 161 to "Manual" position and the control circuit is then set up for so-called manual operation. In effect, this means that the various limit switches, which would in automatic operation control the initiation of subsequent actions, are rendered inoperative. If selectivity switch 162 is turned to "Reduced Volume" or "Low Speed," all operations will take place at creep speed. This speed is useful when testing the set-up of new tooling and for adjusting limit switches.

It will be assumed that the operator next runs the machine tool through its cycle and now desires to slowly index the table. To accomplish this he must push the slow index button 175 which causes, as described with regard to automatic operation, movement of the pawl 104 to unlocked position relative to the index plate 99. The fluid motor 94 driving the index table and index plate 99 will then do so at a slow speed as long as the push button 175 is held in depressed position. However, if the button is released at an intermediate position of an increment of movement, the indexing movement will continue until the lock pawl stops the index plate. Both the increment counter and the index counter are in the control circuit at this time but they are ineffective to control sequencing. The slow index control, push button 175, is used primarily during set-up to check tool clearance and positioning.

The control panel is provided with two additional push buttons. The first of these, push button 176 is an increment index control. This control is used in conjunction with the "Increment" and "Index" counters. The required number of minutes per index having been set on the control panel "Increment" counter push buttons and the required number of index having been set at the "index" counter dial, the operator then presses push button 176 and solenoid "C" is energized to unlock the index motor 94. Solenoid "A" is also energized to provide full pump volume. The "Increment" counter controls the deceleration and lock-up of the fluid motor 94 in the same manner as previously described under the "Automatic Cycle" operation with the exception that the signal which would normally initiate the external machine cycle is ineffective to do so. The movements of the machine elements through their cycle must also be manually initiated. The increment index control is an electrically interlocked control which, when once initiated, will maintain circuit until the completion of one index. The index movement may be interrupted with the "Emergency Stop Button." Under these conditions a premature, delayed lock-up will result. This latter condition results in the table being out of phase with the prescribed index. However, it may be brought back into phase by re-initiating the button 176 after eliminating the cause of the emergency stop. Both counters are in circuit at this time, but only the "Increment" counter is controlling as this circuit by-passes the "Index" counter. The primary use of the "Increment Index" control is for individual indexes of various degrees and in which the operator resets the "Increment" counter after each index. It is not operative unless the machine tool head is in a withdrawn position and has signalled through control relay MCC that the external machine cycle is completed. The "Increment" counter is re-set by push button 176 at the start of each index. This is a memory circuit established through a locking relay, and subsequent operation of this button at intermediate positions in any one index will not disturb the remainder on the counter "read out" lights.

The last push button to be described is push button 177. This push button when pressed causes the index table to return to its starting or home position. That is, upon push button 177 being pressed, solenoid "E" is de-energized and solenoid "C" is energized to release the index motor. Solenoid "A" is also energized for full pump volume. The index table revolves at top speed toward its starting or zero degree position independently of any counter controls at top speed. As the table approaches "Home Position," limit switch 173 is actuated and the table proceeds to home position as described above with regard to the automatic cycle operation.

The primary use of the "Starting Position" push button 177 is to provide a means for returning table 23 to the starting position without the necessity of altering the setting of either of the two counters. The push button 177 may be used with selector switch 161 in either "Manual" or "Auto" position. It is not operative in "Manual" unless the tool head of the associated machine tool is in the withdrawn position and in "Auto" cycle it is only operative after "Cycle Stop" or "Emergency Stop."

Some general features of the operation of the indexing system may be briefly stated as follows:

The "Emergency Stop" control push button 164 stops all operations of the machine under either "Hand" or "Auto" control. However, count is maintained on both counters under these conditions, and in general operations may be resumed from where stopped with the counters controlling sequencing.

The exception to the above would be the operation of the "Home Position" control. Once this control has been initiated and the table has passed through an increment position, it must be returned to the starting position to re-orient the counters to the table.

Regardless of the counter setting, the automatic cycle will be interrupted and the table locked up as it comes into the Home position. Automatic cycle will also stop and must be reinitiated each time the Index Counter counts out and resets. If this latter stop occurs other than at the Home position, it is possible for the operator to dial set both counters to a new position, and, therefore, machine a different pattern of operations on the second portion of the automatic cycle. The product of the Increment Counter times the Index Counter is usually 360 degrees. If it is less than a full revolution, and the machine is cycling under automatic control, it will stop when the last count has satisfied the Index Counter. Operations may proceed under any one of the three following conditions.

(1) The operator may reset the dials of the "Increment Counter" for a different spacing between machining operations. He may change the dial setting on the "Index Counter" for a revised number of indexes and reinitiate the automatic cycle. Note that the first operation under these conditions would be to initiate the machining cycle.

(2) The operator may reinitiate the automatic cycle without changing the settings on either counter. Automatic operation would continue as previously described, starting with the machining cycle. If the summation of twice the original setting of both counters is greater than 360 degrees, the index table will stop at the starting position, both counters will reset, and automatic cycle will be broken.

(3) The operation may press the "Home Position" button 177. The index table will return to starting position, both counters will be reset, and automatic cycle will be broken.

It will be readily apparent that many of the sub-components of the hereinbefore described machine might take a form other than that specifically described. For example, the fluid motor 94 might readily be replaced by an electric motor driving the worm 42 and worm gear 41 through an eddy clutch and brake mechanism, the control of the eddy clutch being accomplished by varying the field excitation thereby regulating the input speed to the drive mechanism.

Referring now to Figs. 12 to 16, inclusive, there is illustrated the exemplification of the principle of the present invention as it might be applied to a rectilinearly movable table. The present embodiment comprises a base 181 provided with suitable ways 182 on which a table 183 is slidably mounted for rectilinear reciprocating movement. The table 183 is illustrated as being coupled to a conventional lead screw 184 rotatably journalled in the base. The lead screw 184 is rotated by a worm gear 185 in mesh with a worm 186 carried on a shaft 187 suitably journalled in bearings at each end thereof.

The shaft 187 also carries an idler gear 188 in mesh with a drive pinion 189 formed on a motor shaft 191. The motor shaft 191 is driven by a fluid motor 94, as used in the previously described embodiment. At its right end, as viewed in Fig. 14, the motor shaft carries a four lobe index plate 192, similar to the previously described index plate 99. The index plate or cam plate 192 has pilot mounted thereon a counting plate or retainer plate 193, corresponding to the button 116 retainer plate 100, previously described. The counting plate 193 contains the counting lugs or buttons 116 on its inner hub diameter and its outer periphery is made up of spokes or peripherally notched segments 194 which function as the speed indicating wheel, corresponding to the spokes 172 on the retainer plate 100. The four counting lugs or buttons 116 in passing the associated counting proximity pick-up 117 unbalance the high frequency oscillating field present at the end of the pick-up, which causes an output at the proximity amplifier in the form of a D.C. pulse. The length of the pulse is in direct proportion to the length of time the lug is in the area of the pick-up head. It is to be noted that this latter condition is independent of speed.

The outer spokes 194 of the counting wheel, that is, the speed wheel portion, pass the magnetic pick-up 171 and in so doing generate an A.C. signal in the pick-up head, the amplitude and frequency of which are in direct proportion to speed. In other words, there is zero voltage in this circuit at zero speed and the voltage and frequency increase as the speed increases.

The counting plate 193 is preferably mounted on the cam plate 192 so that it may be angularly adjusted relative thereto to advance or retard the count point in relation to the four lobe cam plate lock-up lobes 195. This latter adjustment is preferably made at the time of assembly and is set in relation to creep speed adjustment, pawl speed operation, and impact lock-up conditions and to ensure that a counting lug and proximity pick-up are not in alignment at lock-up. The counting plate is adjusted or set for the optimum conditions of counting and lock-up and with complete disregard of the outer spokes in relation to the magnetic pick-up, since the output of this unit is dependent on speed rather than spoke position.

As in the previously described embodiment, the rotation of the index or cam plate 192 is adapted to be blocked by a slidable pawl 196 suitably mounted in a pawl block 197 and shiftable into and out of blocking position by a hydraulic cylinder mechanism 107. Suitable limit switches 165 and 168 are provided to indicate the index plate blocked and unblocked positions of the pawl 196, respectively. Or as referred to with regard to the previously described embodiment, the limit switches 165 and 168 indicate the fluid motor 94 locked and unlocked conditions respectively.

Limit switches 198 and 199 may be provided, as is the usual practice, to indicate the end travel positions of the table 183.

The increment of movement of the table may be any unit desired. As will be readily understood, a proper selection of gear ratios in the gear train comprising the drive pinion 189, idler gear 188, pinion 186, worm gear 185 and lead screw 184 will give a unit of movement per quarter revolution of the motor shaft 191 carrying the impulse generating buttons 116.

Electronically the system functions as in the previously described embodiment and it is not believed necessary to repeat this in detail.

I claim:

1. In a control circuit for controlling the repetitive indexing movements of an indexable means, an electronic pulse generating means, means correlating said pulse generating means with said indexable means to feed an input pulse into said circuit for each predetermined constant increment of movement of the latter, a first pulse counter, a first means for setting said counter to receive a predetermined count of input pulses, a second pulse counter, an accumulator counter, a multivibrator feeding input pulses simultaneously into said second counter and said accumulator counter, a second means for setting said second counter to receive from said multivibrator a predetermined count of pulses corresponding to a fractional portion of the smallest unit counted by said first pulse counter, and means controlled by an output pulse generated by said second counter upon reaching the predetermined count set therein effective to block further input pulses to said second counter and said accumulator counter, said accumulator counter whenever accumulating, upon subsequent index movements of said indexable means, a count equal to the smallest unit of said first counter generating an output pulse negating one of the input pulses from said pulse generating means whereby the latter is required to generate one additional pulse in order to satisfy the count called for by said first counter.

said control circuit thereby permitting said indexable means to be moved an additional increment during some indexing movements to compensate for the error resulting when the desired index movement is fractionally greater than the count set into said first pulse counter.

2. In a control circuit for controlling the repetitive indexing movements of an indexable means, an electronic pulse generating means, means correlating said pulse generating means with said indexable means to feed an input pulse into said circuit for each predetermined constant increment of movement of the latter, a first pulse counter, a first dial operated means for setting said counter to receive a predetermined count of input pulses, a second counter, an accumulator counter, a free-running multivibrator feeding input pulses simultaneously into said second counter and said accumulator counter, a second dial operated means for setting said second counter to receive from said multivibrator a predetermined count of pulses corresponding to a fractional portion of the smallest unit counted by said first pulse counter, and means controlled by an output pulse generated by said second counter upon reaching the predetermined count set therein effective to block further input pulses to said second counter and said accumulator counter, said accumulator counter whenever accumulating, upon subsequent index movements of said indexable means, a count equal to the smallest unit of said first counter generating an output pulse negating one of the input pulses from said pulse generating means whereby the latter is required to generate one additional pulse in order to satisfy the count called for by said first counter, said control circuit thereby permitting said indexable means to be moved an additional increment at intervals to compensate for the error resulting when the desired index movement is fractionally greater than the count set into said first pulse counter, said accumulator counter being pre-set at a plus count of pulses equal to one-half the smallest unit of said first counter whereby the positional error of the indexable means ranges from a maximum of minus one-half to a maximum of plus one-half of an increment of movement.

3. In a control circuit for controlling the repetitive indexing movements of an indexable means, an electronic pulse generating means, means correlating said pulse generating means with said indexable means to feed an input pulse into said circuit for each predetermined constant increment of movement of the latter, a first pulse counter, a first means for setting said counter to receive a predetermined count of input pulses, a second pulse counter, an accumulator counter, a multivibrator feeding input pulses simultaneously into said second counter and said accumulator counter, a second means for setting said second counter to receive from said multivibrator a predetermined count of pulses corresponding to a fractional portion of the smallest unit counted by said first pulse counter, means controlled by an output pulse generated by said second counter upon reaching the predetermined count set therein effective to block further input pulses to said second counter and said accumulator counter, said accumulator counter whenever accumulating, upon subsequent index movements of said indexable means, a count equal to the smallest unit of said first counter generating an output pulse negating one of the input pulses from said pulse generating means whereby the latter is required to generate one additional pulse in order to satisfy the count called for by said first counter, said control circuit thereby permitting said indexable means to be moved an additional increment during some indexing movements to compensate for the error resulting when the desired index movement is fractionally greater than the count set into said first pulse counter, and means for resetting said first and second counters at a predetermined time in the cycle of operation.

4. In a control circuit for controlling the repetitive indexing movements of an indexable means, an electronic pulse generating means, means correlating said pulse generating means with said indexable means to feed an input pulse into said circuit for each predetermined constant increment of movement of the latter, a first pulse counter, a first means for setting said counter to receive a predetermined count of input pulses, a second pulse counter, an accumulator counter, a multivibrator feeding input pulses simultaneously into said second counter and said accumulator counter, a second means for setting said second counter to receive from said multivibrator a predetermined count of pulses corresponding to a fractional portion of the smallest unit counted by said first pulse counter, means controlled by an output pulse generated by said second counter upon reaching the predetermined count set therein effective to block further input pulses to said second counter and said accumulator counter, said accumulator counter whenever accumulating, upon subsequent index movements of said indexable means, a count equal to the smallest unit of said first counter generating an output pulse negating one of the input pulses from said pulse generating means whereby the latter is required to generate one additional pulse in order to satisfy the count called for by said first counter, said control circuit thereby permitting said indexable means to be moved an additional increment during some indexing movements to compensate for the error resulting when the desired index movement is fractionally greater than the count set into said first pulse counter, means for resetting said first, second and accumulator counters, said first and second counters being reset prior to the start of each index movement of the indexable means and said accumulator counter being reset upon said indexable means returning to its starting position.

5. In a control circuit for controlling the repetitive indexing movements of a rotary work supporting table, an electronic pulse generating means, means correlating said pulse generating means with said work supporting table to feed an input pulse into said circuit for each one minute increment of rotary movement of said table, a first pulse counter, a first pre-setting means for setting said counter to receive a predetermined count of input pulses, a second pulse counter, an accumulator counter, a free-running multivibrator feeding input pulses simultaneously into said second counter and said accumulator counter, a second pre-setting means for setting said second counter to receive from said multivibrator a predetermined count of pulses corresponding to a fractional portion of a one minute increment, means controlled by an output pulse generated by said second counter upon reaching the count set therein effective to block further input pulses to said second counter and accumulator counter, said accumulator counter whenever accumulating, upon subsequent index movements of said table, a count equal to the number of pulses corresponding to a one minute increment of movement generating an output pulse negating one of the input pulses from said pulse generating means whereby the latter is required to generate one additional pulse in order to satisfy the count required by said first counter, said control circuit thereby permitting said table to be moved an additional one minute increment during some indexing movements to compensate for the error resulting when the desired index movement is fractionally greater than the count set into said first pulse counter.

6. In a control circuit for controlling the repetitive indexing movements of a rotary work supporting table, an electronic pulse generating means, means correlating said pulse generating means with said work supporting table to feed an input pulse into said circuit for each one minute increment of rotary movement of said table, a first pulse counter, a first pre-setting means for setting said counter to receive a predetermined count of input pulses, a second pulse counter, an accumulator counter, a free-running multivibrator feeding input pulses simultaneously into said second counter and said accumulator counter, a second pre-setting means for setting said second counter to receive from said multivibrator a predetermined count of pulses corresponding to a fractional portion of a one minute increment, means controlled by an output pulse generated by said second counter upon reaching the count set therein effective to block further input pulses to said second counter and accumulator counter, said accumulator counter whenever accumulating, upon subsequent index movements of said table, a count equal to the number of pulses corresponding to a one minute increment of movement generating an output pulse negating one of the input pulses from said pulse generating means whereby the latter is required to generate one additional pulse in order to satisfy the count required by said first counter, said control circuit thereby permitting said table to be moved an additional one minute increment during some indexing movements to compensate for the error resulting when the desired index movement is fractionally greater than the count set into said first pulse counter, said accumulator counter being pre-set at a plus count of pulses equal to one-half minute of movement of said table whereby the positional error of the index table at any index position will never exceed plus or minus one-half minute.

References Cited in the file of this patent

UNITED STATES PATENTS

| | | |
|---|---|---|
| 2,537,427 | Seid et al. | Jan. 9, 1951 |
| 2,710,934 | Senn | June 14, 1956 |
| 2,842,986 | Rodal | July 15, 1958 |
| 2,853,900 | Hillyer | Sept. 30, 1958 |